United States Patent [19]

Beasley

[11] Patent Number: 4,601,248

[45] Date of Patent: Jul. 22, 1986

[54] MINIMUM TILLAGE PLANTING APPARATUS

[75] Inventor: Eustace O. Beasley, Raleigh, N.C.

[73] Assignee: North Carolina State University, Raleigh, N.C.

[21] Appl. No.: 620,118

[22] Filed: Jun. 13, 1984

[51] Int. Cl.⁴ .................. A01B 49/02; A01C 5/00
[52] U.S. Cl. ........................................ 111/52; 111/85;
172/151; 172/182; 172/190; 172/196
[58] Field of Search .................. 111/7, 52, 73, 80, 85,
111/86; 172/40, 41, 121, 145, 146, 149–151,
155, 156, 166, 177, 182–184, 180, 190, 191, 196,
201, 271, 395, 421, 484, 514, 552, 553, 555, 540,
574, 699, 725, 764

[56] References Cited

U.S. PATENT DOCUMENTS

| 1,136,172 | 4/1915 | Scott | 172/699 X |
| 1,625,278 | 4/1927 | Paul | 172/699 X |
| 2,701,513 | 2/1855 | Hyland et al. | 172/166 |
| 2,952,322 | 9/1960 | Jurcheck | 172/196 |
| 3,085,635 | 4/1963 | Livermore | 172/772 X |
| 3,122,111 | 2/1964 | Taylor | 111/80 |
| 3,202,222 | 8/1965 | Norris | 172/177 |
| 3,811,387 | 5/1974 | Meiners | 172/166 X |
| 4,055,126 | 10/1977 | Brown et al. | 111/85 |
| 4,213,408 | 7/1980 | West et al. | 172/196 X |
| 4,230,054 | 10/1980 | Hatcher | 111/62 |
| 4,241,674 | 12/1980 | Mellinger | 111/52 |
| 4,244,306 | 1/1981 | Peterson et al. | 111/7 |
| 4,267,783 | 5/1981 | Hendrix et al. | 111/52 |
| 4,269,274 | 5/1981 | Robertson et al. | 172/699 |
| 4,285,284 | 8/1981 | van der Lely | 111/85 |
| 4,333,534 | 6/1982 | Swanson et al. | 172/464 |
| 4,415,042 | 11/1983 | Cosson | 172/725 X |
| 4,422,392 | 12/1983 | Dreyer et al. | 111/52 |
| 4,560,010 | 12/1985 | Weichel | 172/196 |

FOREIGN PATENT DOCUMENTS

| 81265 | 3/1954 | Denmark | 172/699 |
| 650688 | 9/1937 | Fed. Rep. of Germany | 111/10 |
| 2719713 | 11/1978 | Fed. Rep. of Germany | 111/52 |
| 2900716 | 7/1979 | Fed. Rep. of Germany | 172/271 |
| 378152 | 6/1973 | U.S.S.R. | 111/10 |

Primary Examiner—James R. Feyrer
Attorney, Agent, or Firm—Bell, Seltzer, Park & Gibson

[57] ABSTRACT

A minimum tillage planting apparatus includes a soil conditioning device comprising a coulter for cutting through surface residue and slicing into the soil, a plow element behind and in alignment with the coulter for penetrating and lifting the soil, and a pair of spaced-apart pressure wheels located above the point of the plow element for exerting a downward pressure on the soil and, in cooperation with the plow element, creating a crushing, shearing action on the soil. A pair of filler wheels are provided rearwardly of the plow element to fill the furrow formed by the plow element and to level the row zone for a furrow opening means, seed depositing means for depositing seeds in the opened furrow and seed covering and soil firming or compacting means, all of which follow the pair of filler wheels.

10 Claims, 6 Drawing Figures

MINIMUM TILLAGE PLANTING APPARATUS

The present invention relates to the planting of certain crops with limited soil preparation and more particularly to an apparatus for such planting with an improved soil conditioning device particularly useful in clay-type soil.

BACKGROUND OF THE INVENTION

Planting corn, soybeans and certain other crops with limited soil preparation has many advantages, including reduced soil erosion, less runoff, fuel conservation, and less time required for planting. Sloping soils which would sustain too much erosion if planted to row crops by conventional methods can be safely planted using limited tillage only.

Planting systems in which very minimal tillage is done to permit placement of seed in the soil have usually been termed "no-till" planting. It is a misnomer, since obviously some tillage must be done to make an opening in the soil to receive the seed. Systems which do more than the very minimal amount of tillage to make an opening for the seed, but less than plowing, and limit tillage more or less to the immediate row zone, are called by various names such as "minimum tillage," "reduced tillage," "rip-plant," etc. These intermediate tillage-planting systems retain many of the advantages of "no-till" planting, but are a concession to the fact that something more than merely making a minimal opening in the soil to receive the seed is desirable in order to provide a more optimal environment for seed germination and seedling emergence, particularly in soils which tend to be hard, cloddy, sticky or crusty. Loose, friable, granular and flowable soil is needed, at least in the immediate row zone, to permit reliable placement and coverage of the seed by the planter, and to help ensure that good soil-seed contact is established by the firming device of the planter. Good contact is essential so that moisture transfer from soil to seed can be initiated and continue until plant roots emerge to take over the moisture acquisition function.

"No-till" planting units frequently have a flat, ripple, or fluted coulter which goes directly in front of the planter opener, cutting through surface trash and slicing two to four inches into the soil. The seed-furrow opening device on the planter, often of the double-disc type, follows directly in the slot or impression made by the leading coulter and deposits seed to a preset depth. A press wheel on the planter then squeezes the slot closed by exerting pressure on either side of, or directly over the seed, or both. This system works well in mellow or low-strength soils under a wide range of moisture levels, and is satisfactory in high-strength, crusting soils when moisture levels are optimal.

In clays or other soils which tend to be sticky when wet, and hard or brittle when dry, the "no-till" planter may penetrate under dry conditions only with the addition of much static weight, if at all. If penetration is accomplished, the seed covering and soil firming components of the planter may not function properly because the soil has not been rendered loose and flowable by the "no-till" coulter and seed furrow opener. Many of these same soils tend to be sticky when slightly wet, and although penetration can then be easily accomplished, the plasticity of the soil makes good seed coverage difficult and unreliable. These soils which are more difficult to handle satisfactorily with "no-till" planters tend to occur predominantly on slopes where the limited tillage approach to row-crop production is most needed.

In an attempt to overcome the penetration problem, "no-till" planting units have been modified by placing chisel points, subsoilers and other tillage elements directly behind the leading coulter and in front of or in lieu of the seed furrow opener of the planter. These elements aggressively penetrate even hard, dry clay soils without the addition of weight; in fact, they must usually be supported by gauge wheels, tractor lift or both to prevent soil reaction forces from pushing them too deep. Some units have included tines, fluted coulters or other elements behind the chisel shank to fill voids in the slot and firm the soil ahead of the planter seed furrow opener. This approach has been successful with mellow soils because the lifting action of the chisel or subsoiler point causes these mellow soils to crumble and flow, creating a loose, soft, friable and highly desirable seedbed.

However, this approach has not proven successful with other than mellow soils because when dry, crusted soil is lifted by a chisel or subsoiler point, it often breaks along natural fracture lines into large clods which are unsuitable for a seedbed. These clods tend to be rolled or pushed partly out of the row zone, leaving an obstacle-strewn furrow with little or no loose soil available for seed coverage. The planter is tossed and jolted as it negotiates the obstacle course, causing poor seed plate cell fill, inconsistent seed furrow opener penetration, and unreliable seed coverage. Packer or filler tines, coulters, or wheels behind the chisel shank do not adequately crush, slice or otherwise disintegrate clods to create a satisfactory seedbed because (1) the clods are unrestrained and can move to avoid these elements; (2) not enough force can be brought to bear to crush them; or (3) loosened soil beneath the clods may yield and prevent the development of enough pressure to crush clods.

With the foregoing in mind, it is an object of the present invention to provide an improved soil conditioning device for minimum tillage planting which is particularly useful in clay-type soil but which functions equally well in other soils and which overcomes the deficiencies of prior limited tillage planting devices and produces a narrow row zone of loose, soft and friable soil.

A more specific object of the present invention is to provide a minimum tillage planting apparatus with improved soil conditioning means which provides loose, soft and friable soil for receipt of seeds even in clay-type soil.

SUMMARY OF THE INVENTION

These objects are accomplished in accordance with the present invention by providing a planting apparatus which includes a soil conditioning device comprising a coulter for cutting through surface residue and slicing the soil including any crust thereon, a plow element behind and in alignment with the coulter and preferably including a chisel or subsoiler point to penetrate and lift the soil behind the coulter and a pair of spaced-apart pressure wheels located above said plow element point for exerting a downward pressure on the soil in opposition to the lifting action of the plow element, for creating a crushing, shearing action on the soil to prevent the formation of large clods and to produce a loose and granular soil suitable for receipt of seeds. The planting apparatus further includes furrow opening means following the plow element for opening a furrow in the conditioned soil, seed depositing means for depositing seed in the furrow, and seed covering means for covering the seed with soil and for compacting the soil around the seed.

DETAILED DESCRIPTION OF THE PREFERRED EMBODIMENT

Figure 1:
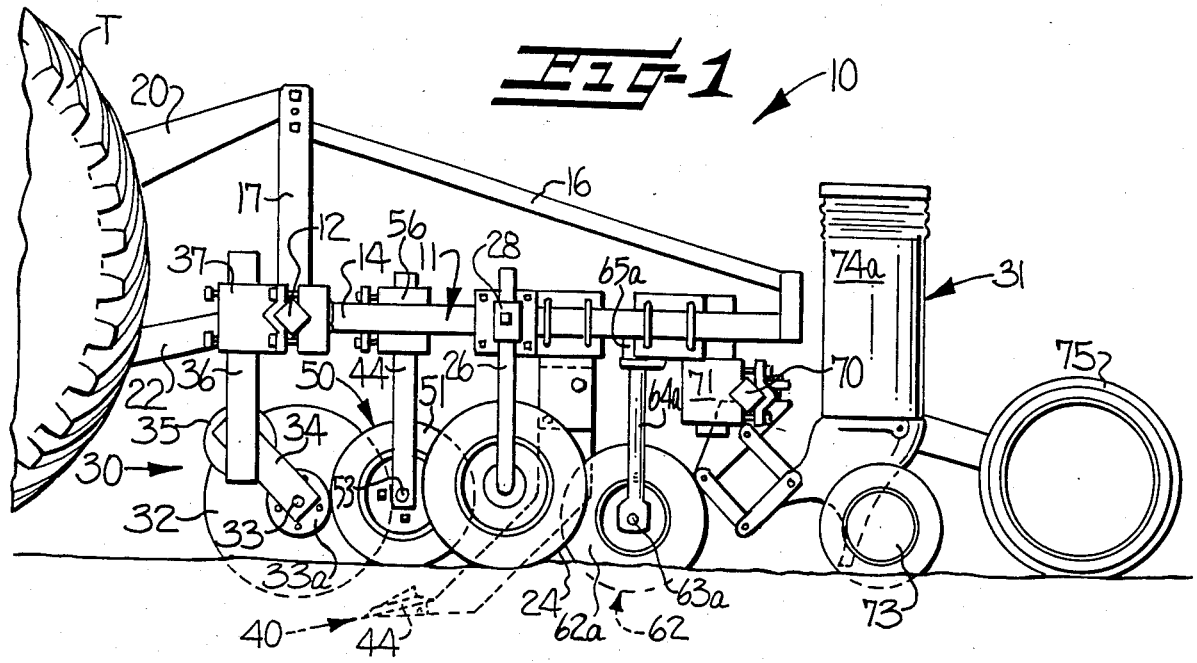
FIG. 1 is a side elevational view of the minimum tillage planting apparatus of the present invention.
Figure 2:
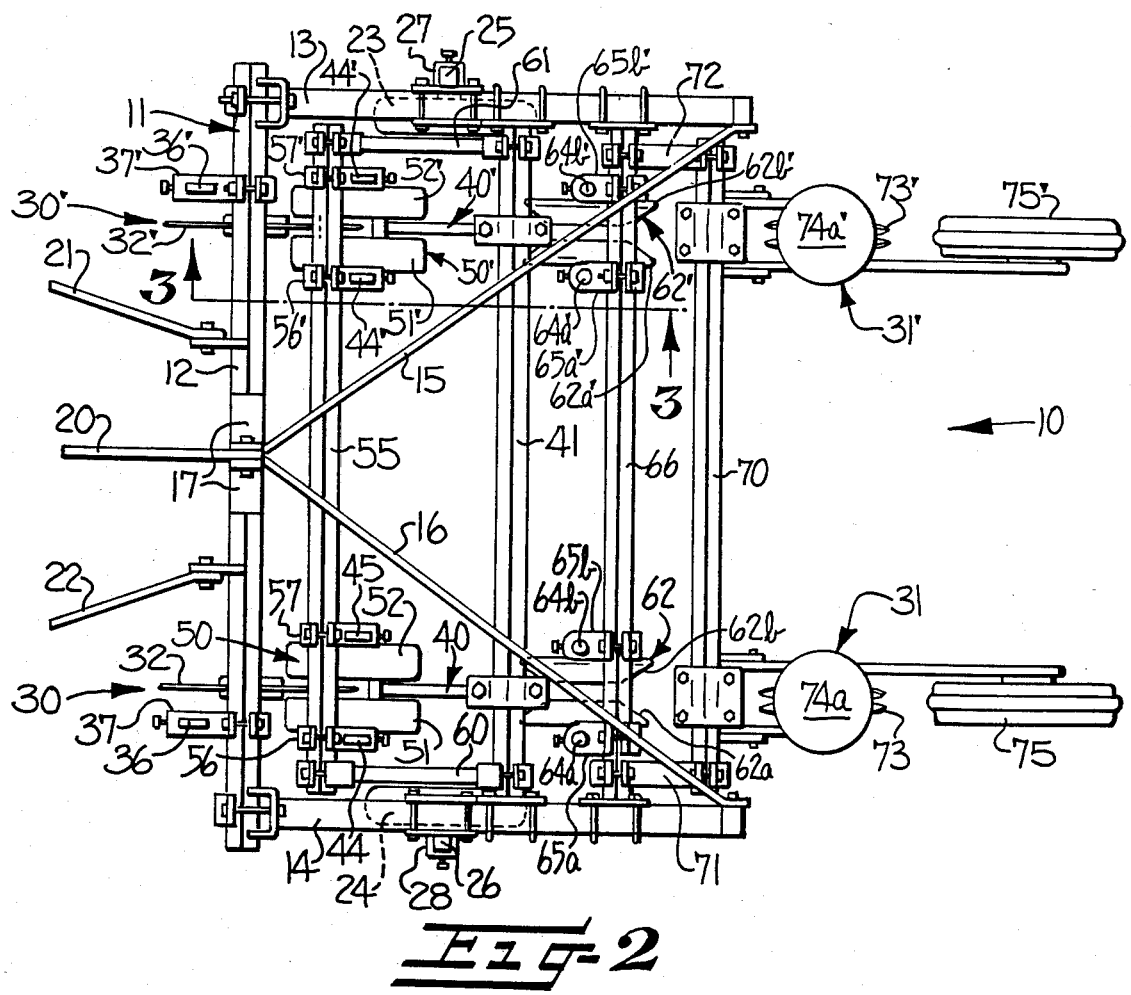
FIG. 2 is a top plan view of the planting apparatus shown in FIG. 1.
Figure 3:
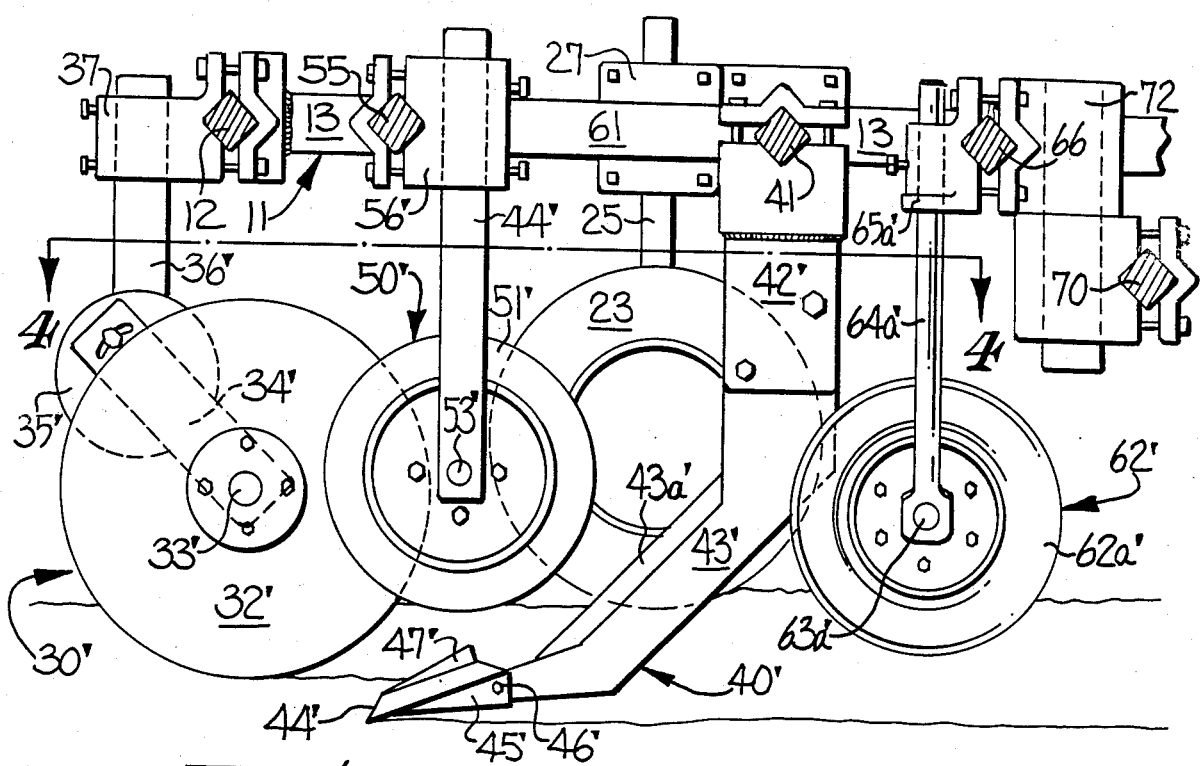
FIG. 3 is an enlarged fragmentary sectional view taken substantially along line 3—3 in FIG. 2.
Figure 4:
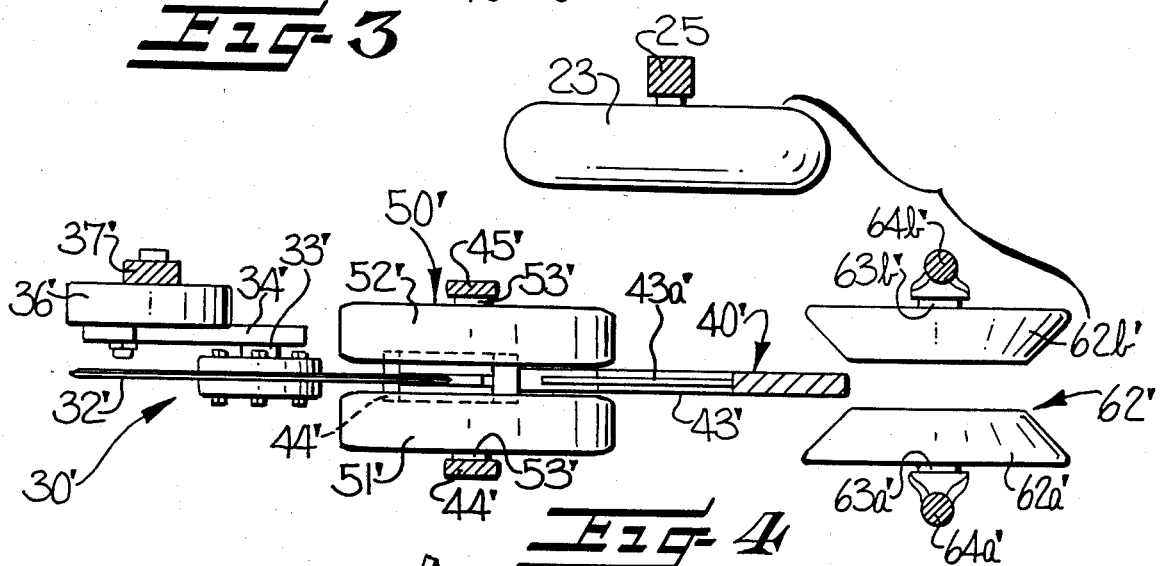
FIG. 4 is a fragmentary sectional view taken substantially along line 4—4 in FIG. 3.

Referring now more specifically to the drawings and particularly to FIG. 1, there is shown a minimum tillage planting apparatus incorporating the features of the present invention which is generally indicated at 10. Planting apparatus 10 includes a main frame 11 which includes a front transverse member 12 (FIG. 2) and side members 13 and 14 which are connected at their forward ends to transverse member 12. Side members 13 and 14 are connected at their rearward ends to transverse braces 15 and 16 which are connected at their forward ends to a vertical post member 17. Vertical post member 17 is mounted on front transverse member 12 and forms the center connection for a three point hitch 20, 21 and 22, the side connections 21 and 22 of which are connected to front transverse member 12. The three point hitch is adapted to be connected to a suitable pulling apparatus, such as tractor T, partially shown in FIG. 1.

A pair of depth gauge wheels 23 and 24 are mounted on side members 13 and 14 of main frame 11. Wheels 23 and 24 are journaled for rotation on shafts carried by standards 25, 26 which in turn are mounted for vertical adjustment in brackets 27, 28 mounted on side members 13 and 14, respectively. This arrangement permits vertical adjustment of wheels 23 and 24 for limiting penetration of the soil when planting apparatus 10 is being used in mellower soils.

The minimum tillage planting apparatus 10 has a two-phase operation, the first phase being soil conditioning and the second phase being seed deposition and covering. Main frame 11 can carry any desired number of soil conditioning devices and seed depositing means, but two such arrangements are illustrated as being carried by main frame 11 in the drawings. Since the individual elements of these devices are identical, like reference characters will be used for like parts, with the prime notation added.

Main frame 11 carries soil conditioning devices generally referred to as 30, 30' and seed depositing and covering means generally indicated at 31, 31'. Each of the soil conditioning devices 30, 30' includes a flat disc coulter 32, 32' which is journaled for rotation on a shaft 33, 33' and hub 33a, 33a' carried by a bracket 34, 34'. Bracket 34, 34' is adjustably mounted on a rubber torsional spring 35, 35' to spring-bias coulter 32, 32' downwardly into contact with the soil. Torsional spring 35, 35' is mounted on a vertical standard 36, 36' which in turn is mounted for vertical adjustment in a bracket 37, 37' on main frame member 12. Coulter 32, 32' will rotate on its shaft 33, 33' as planting apparatus 10 is moved over the ground, and will slice through surface debris and the upper surface of the soil. Normally, coulter 32, 32' would be adjusted so as to slice into the soil to a predetermined depth of about three or four inches.

A plow element 40, 40' is mounted on an auxiliary frame member 41 which in turn is mounted at its opposite ends on main frame side members 13 and 14. Plow element 40, 40' includes a vertical portion 42, 42' which extends downwardly to a point spaced above the surface of the ground. A shank portion 43, 43' is mounted at its upper end on the lower end of vertical portion 42, 42' and extends downwardly and forwardly at approximately 45 degrees to a point disposed just rearwardly of the coulter 32, 32'. The leading edge of shank portion 43, 43' has a knife edge 43a, 43a' mounted thereon to assist movement of the shank portion through the soil.

Figure 5:
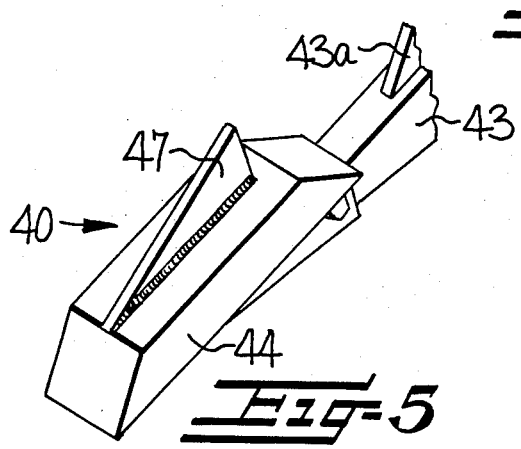
FIG. 5 is a fragmentary enlarged perspective view of the lower end of the shank portion of the plow element and the chisel point as shown in the lower medial portion of FIG. 3.
Figure 6:
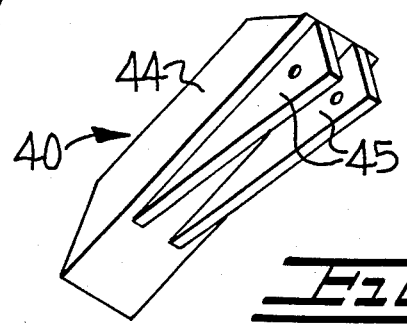
FIG. 6 is a perspective view of the chisel point as shown in FIG. 5 showing the bottom thereof.

A chisel or subsoiler point 44, 44' is mounted on the lower end of shank portion 43, 43'. Preferably, point 44, 44' is disposed at an acute angle of approximately 20 degrees with the horizontal so as to produce the proper lifting action on the soil. Chisel point 44, 44' preferably is approximately two inches wide by approximately six inches long and has two brackets 45, 45' on its bottom surface for connection of the point to the forward end of shank portion 43, 43' by a suitable heel bolt 46, 46' (FIG. 5). Preferably, chisel point 44, 44' includes a center fin 47, 47' which slopes upwardly and rearwardly from its forward end near the leading edge of chisel point 44, 44' to a height of approximately 1¾ inches at its termination near the trailing end of point 44, 44'. This center fin helps to break up and divide the soil so that it flows around the shank portion 43, 43'. Plow element 40, 40' with chisel point 44, 44' will readily penetrate into the soil and move through the soil as planting apparatus 10 is pulled over the ground, and chisel point 44, 44' will break up and lift the soil upwardly as it moves therethrough.

To prevent the breakup of the soil along natural fracture lines into large clods which are unsuitable for a seedbed when dry, crusted, clay-type soil is lifted by plow element 40, 40', pressure means 50, 50' is provided for cooperation with the chisel point 44, 44' to create a crushing, shearing action between pressure means 50, 50' and the chisel point 44, 44' of plow element 40, 40'. This crushing, shearing action fractures the soil more thoroughly than if it were allowed to break up naturally, and provides a loose, granular soil appropriate for the receipt of seeds in planting.

Pressure means 50, 50' preferably comprises a pair of pressure wheels 51, 52 and 51', 52' spaced apart a predetermined distance and journaled for rotation on a shaft 53, 53'. Shaft 53, 53' is mounted at its opposite ends on vertical standards 54, 55 and 54', 55' which in turn are carried at their upper ends on an auxiliary frame member 55 by brackets 56, 57 and 56', 57'. Auxiliary frame member 55 in turn is carried at its opposite ends on frame members 60, 61 which are in turn mounted on auxiliary frame member 41 at their rearward ends. This arrangement permits the pressure wheels 51, 52 and 51', 52' to be vertically adjusted as a unit relative to plow element 40, 40' and the surface of the ground. Additionally, each pair of the wheels 51, 52 and 51', 52' are individually adjustable by means of the brackets 56, 57 and 56', 57'. Preferably, wheels 51, 52 and 51', 52' have solid rubber tires approximately 15 inches in diameter with a nearly flat face approximately three inches wide. Also, the wheels are preferably spaced apart a distance no greater than the width of chisel point 44, 44' and more preferably a distance less than that width.

Pressure wheels 51, 52 and 51', 52' are mounted between coulter 32, 32' and plow element 40, 40' such that the wheels contact the surface of the ground directly above chisel point 44, 44'. In this arrangement, the rear portion of coulter 32, 32' is disposed between the pressure wheels 51, 52 and 51', 52'.

A pair of beveled steel filler wheels 62, 62' are mounted rearwardly of plow element 40, 40' for filling and firming the slight furrow left by the shank portion 43, 43' of plow element 40, 40' and for crushing some clods which remained within the row zone formed by the soil conditioning device 30, 30'. The pair of beveled filler wheels 62a, 62b and 62a', 62b' are respectively journaled in shafts 63a, 63b and 63a', 63b' which in turn are mounted on vertical standards 64a, 64b and 64a', 64b'. Standards 64a, 64b and 64a', 64b' are mounted at their upper ends in adjustable brackets 65a, 65b and 65a', 65b' which in turn are carried by an auxiliary frame member 66 mounted at its opposite ends on main frame side members 13 and 14. By this arrangement, the beveled filler wheels are vertically adjustable to provide the appropriate pressure and contact with the soil for filling the furrow and crushing small clods. Preferably, the filler wheels 62a, 62b and 62a', 62b' are approximately 14 inches in diameter and are positioned with their axes of rotation approximately 8 to 10 inches behind the point at which the shank portion 43, 43' of plow element 40, 40' penetrates into the soil.

The seed depositing and covering means 31, 31' is carried by an auxiliary frame member 70 which is carried at its opposite ends on frame members 71, 72 which are mounted at their forward ends on auxiliary frame member 66. Seed planting means 31, 31' includes furrow opening means 73, 73' preferably of the double disc type, for opening a seed receiving furrow in the row zone. Seed depositing means 74, 74' is mounted above furrow opening means 73, 73' and includes a seed hopper 74a, 74a' and seed depositing devices (not shown) for dropping seeds into the furrow opened by furrow opening means 73, 73'. A seed covering and soil compacting means 75, 75' trails behind furrow opening means 73, 73' for covering the seed deposited by seed depositing means 74, 74' with soil and for firming or compacting the soil around the seeds for proper seed-soil contact.

In operation, planting apparatus 10 has the various elements thereof adjusted depending upon the type of soil in which planting is to be performed and is then moved over the surface of the ground by being pulled behind a suitable tractor T. Experience to date indicates that planting apparatus 10 will function in a superior manner to prepare for planting previously untilled clay or clay-type soil and to plant seeds in the thusly prepared or conditioned soil in a single pass operation which resulted in the planting of seeds in a loose, friable and granular seed bed approximately six inches wide and seven inches deep with no disturbance of the soil in the space between row zones.

In such operation, the coulters 32, 32' slice through surface debris and the upper portion of the soil facilitating the flow of soil and debris around either side of the shank portions 43, 43' of plow elements 40, 40'. These plow elements readily penetrate into and move through the soil with the chisel points 44, 44' dividing and lifting the soil as they pass therethrough. The pressure wheels 51, 52 and 51', 52' exert a downward pressure or force on the soil above the chisel points 44, 44' resulting in a crushing and shearing action on the soil above and to the sides of the chisel points 44, 44' which crumbles the soil into a finer texture than would result without this cooperation. Simultaneously, the pressure wheels 51, 52 and 51', 52' help to prevent vertical and lateral displacement of the soil away from the row zone. The center fins on the chisel points 44, 44' slice the soil from below, complementing the action of the disc coulters 32, 32' in facilitating division of the soil and flow around the shanks of the plow elements 40, 40'.

The pressure wheels are vertically adjustable to vary the pressure applied to the soil dependent upon the conditions of the soil with the most important condition appearing to be moisture content. Experiments to date indicate that dryer soils require greater pressure and, therefore, lower positioning of the pressure wheels 51, 52 and 51', 52' for optimum fracturing of the soil in the row zone. Under moist soil conditions, the pressure wheels, if lowered too far, will cause clay-type soil to be pressed and extruded into the space between the wheels which will cause the wet clay to form into sticky clumps or strips.

The filler wheels 62, 62' following the plow elements 40, 40' fill and firm the slight furrow left by the shank portions 43, 43' and crush some of the clods which remain within the row zone. This soil conditioning results in a loose friable and granular seed bed appropriate for receipt of seeds therein.

The furrow opening means 73, 73' open seed receiving furrows in the previously prepared and conditioned row zones. Seed depositing means 74, 74' deposit seeds in the furrows opened by furrow opening means 73, 73' and seed covering means 75, 75' cover the seeds with soil and firm the soil around the seeds.

In the drawings and specification there has been set forth a preferred embodiment of the invention, and although specific terms are employed, they are meant in a generic and descriptive sense only and not for purposes of limitation, the scope of the invention being defined in the claims.

That which is claimed is:

1. A soil conditioning apparatus, particularly useful in clay-type soil, for producing a narrow row zone of loose, soft, friable soil for the planting of seed without prior tillage and without disturbing the soil between row zones, said apparatus comprising
    (a) a main frame supported for movement over the ground,
    (b) a coulter supported by said main frame for rolling engagement with the ground and being adapted to cut through surface residue and slice into the soil to a predetermined depth,
    (c) a plow element supported by said main frame behind said coulter and extending downwardly and forwardly to a point behind and below said coulter and in alignment therewith, said plow element being adapted to penetrate into and lift the soil as its travels therethrough at a predetermined depth, and
    (d) a pair of spaced-apart pressure means carried by said main frame on opposite sides of the rear portion of said coulter and adjacent opposite sides of said plow element and directly over the point thereof for exerting a downward pressure on the soil on both sides of said plow element in opposition to the lifting action of said plow element for creating a crushing, shearing action on the soil to produce a narrow row zone of loose, soft and friable soil suitable for the planting of seed therein.

2. Apparatus according to claim 1 including (e) row covering and leveling means carried by said main frame rearwardly of said plow element for covering the furrow formed by said plow element and for leveling the row zone.

3. Apparatus according to claim 1 wherein said pair of pressure means comprises a pair of wheels mounted for rotation of said main frame and adapted for rolling engagement with the soil above the point of said plow element.

4. A soil conditioning apparatus, particularly useful in clay-type soil, for producing a narrow row zone of loose, soft, friable soil for the planting of seed without prior tillage and without disturbing the soil between row zones, said apparatus comprising (a) a main frame supported for movement over the ground, (b) a coulter supported by said main frame for rolling engagement with the ground and being adapted to cut through surface residue and slice into the soil to a predetermined depth, (c) a plow element supported by said main frame behind said coulter and extending downwardly and forwardly to a chisel point behind and below said coulter and in alignment therewith, said plow element being adapted to penetrate into and lift the soil as it travels therethrough at a predetermined depth, and (d) a pair of spaced-apart pressure wheels carried by said main frame and extending downwardly directly over said chisel point of said plow element for exerting a downward pressure on the soil on both sides of said plow element, said pressure wheels cooperating with said chisel point of said plow element for creating a crushing, shearing action on the soil to produce a narrow row zone of loose, soft and friable soil suitable for the planting of seed therein, said frame including means for adjustably mounting said pressure wheels from the frame for varying the downward pressure applied to the soil in accordance with varying soil conditions.

5. Apparatus according to claim 4 wherein said chisel point includes a center fin sloping upwardly and backwardly from a forward end located adjacent the leading end of said point to a rearward end located adjacent the trailing end of said point to assist in breaking up and dividing the soil being lifted by said point.

6. Apparatus according to claim 5 wherein said plow element includes a shank portion extending downwardly and forwardly at approximately a 45 degree angle, and wherein said chisel point is mounted on the lower end portion of said shank portion at an angle of approximately 20 degrees to the horizontal.

7. Apparatus according to claim 4 wherein said pressure wheels are spaced apart a distance no greater than the width of said chisel point of said plow element.

8. Apparatus according to claim 7 wherein said pressure wheels are spaced apart a distance less than the width of said chisel point.

9. Apparatus according to claim 8 including (e) row covering and leveling means carried by said main frame rearwardly of said plow element and in alignment therewith for covering the furrow formed by said plow element and for leveling the row zone.

10. A minimum tillage planting apparatus, particularly useful in clay-type soil, for planting seeds in a narrow row zone of loose, soft, friable soil without prior tillage and without disturbing the soil between rows zones, said apparatus comprising (a) a main frame supported for movement over the ground, (b) a coulter supported by said main frame for rolling engagement with the ground and being adapted to cut through surface residue and slice into the soil to a predetermined length, (c) a plow element supported by said main frame behind said coulter and extending downwardly and forwardly at an acute angle to the horizontal to a point behind and below said coulter and in alignment therewith, said plow element being adapted to penetrate into and lift the soil as it travels therethrough, (d) a pair of spaced-apart pressure wheels carried by said main frame on opposite sides of the rear portion of said coulter and directly over the point of said plow element, said pressure wheels being adapted to exert a downward pressure on the soil on both sides of said plow element as it its being lifted by said plow element for creating a crushing, shearing action on the soil to produce a narrow row zone of loose, soft and friable soil suitable for the planting of seed therein, (e) furrow opening means carried by said main frame rearwardly of said plow element and in alignment therewith for opening a seed receiving furrow in said row zone, (f) seed depositing means carried by said main frame and operatively associated with said furrow opening means for depositing seed in the furrow opened by said furrow opening means, and (g) seed covering means carried by said main frame rearwardly of and in alignment with said seed depositing means for covering the seed deposited in the furrow with soil and for compacting the soil around the seeds.

* * * * *